(12) United States Patent
Dangy-Caye

(10) Patent No.: US 9,257,828 B2
(45) Date of Patent: Feb. 9, 2016

(54) THREE-POLE LIGHTNING ARRESTOR INTEGRATED INTO A RESIDENTIAL GATEWAY WITH LIGHTNING IMPACT DETECTOR

(71) Applicant: SAGEMCOM BROADBAND SAS, Rueil Malmaison (FR)

(72) Inventor: Nicolas Dangy-Caye, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 88 days.

(21) Appl. No.: 14/364,233

(22) PCT Filed: Dec. 3, 2012

(86) PCT No.: PCT/EP2012/074274
§ 371 (c)(1),
(2) Date: Jun. 10, 2014

(87) PCT Pub. No.: WO2013/087443
PCT Pub. Date: Jun. 20, 2013

(65) Prior Publication Data
US 2014/0355164 A1    Dec. 4, 2014

(30) Foreign Application Priority Data

Dec. 12, 2011 (FR) ..................... 11 61484

(51) Int. Cl.
*H01C 7/12* (2006.01)
*H02H 1/00* (2006.01)
(Continued)

(52) U.S. Cl.
CPC . *H02H 1/04* (2013.01); *H02H 9/04* (2013.01); *H02H 9/06* (2013.01); *H04M 11/062* (2013.01)

(58) Field of Classification Search
CPC .............. H02H 9/04; H01T 4/08; H01Q 1/50; H01R 24/48
USPC .......................................... 361/119
See application file for complete search history.

(56) References Cited

U.S. PATENT DOCUMENTS

2004/0100751 A1* 5/2004 Ammann ................. H01Q 1/50
361/119
2004/0264087 A1* 12/2004 Bishop .................. H04M 1/745
361/91.1

(Continued)

FOREIGN PATENT DOCUMENTS

GB    2 261 293 A    3/2006
GB    2 421 860 A    7/2006

(Continued)

*Primary Examiner* — Dharti Patel
(74) *Attorney, Agent, or Firm* — Muncy, Geissler, Olds & Lowe, P.C.

(57) ABSTRACT

An electronic appliance powered by a power supply unit connected to a mains type electricity network, and for connection to a transmission line having two conductor elements and to a terminal in order to transfer data between the line and the terminal. The appliance has a front-end component connected to the line via an isolating transformer. Also, various additional components are connected to an electrical ground of the appliance. A discharge component is connected to the conductor elements of the line and becomes conductive in the event of a voltage surge due to a lightning strike. This eliminates the surge by establishing a flow of current from the line to electrical ground. A capacitive and/or resistive type divider component is interposed between the discharge component and electrical ground in order to co-operate with the power supply unit and/or one or more additional components to constitute a divider bridge.

10 Claims, 3 Drawing Sheets

(51) Int. Cl.
   *H02H 1/04* (2006.01)
   *H02H 9/06* (2006.01)
   *H04M 11/06* (2006.01)
   *H02H 9/04* (2006.01)
   *H02H 3/22* (2006.01)

(56) References Cited

U.S. PATENT DOCUMENTS

2006/0232906 A1* 10/2006 Sueoka ............... H02H 3/048
                                                          361/118
2008/0037192 A1* 2/2008 Huang ............... H01R 13/6658
                                                          361/118
2011/0026178 A1* 2/2011 Luo ..................... H04L 25/0266
                                                          361/91.1
2012/0040559 A1* 2/2012 Chang ............... H01R 13/6658
                                                          439/607.01

FOREIGN PATENT DOCUMENTS

WO    WO 2004/006408 A1    1/2004
WO    WO 2006/031158 A1    3/2006

* cited by examiner

THREE-POLE LIGHTNING ARRESTOR INTEGRATED INTO A RESIDENTIAL GATEWAY WITH LIGHTNING IMPACT DETECTOR

The invention relates to an electronic appliance fitted with means for providing protection against a voltage surge due to lightning.

BACKGROUND OF THE INVENTION

Electronic appliances of the "home gateway" or "modem" type, or more generally electronic appliances for transferring data between a telephone line and any kind of terminal such as a computer, need to be protected against lightning impacts that might occur on conductor elements of the telephone line.

In this context, ITU-T Recommendation K21 defines reference waveforms representative of lightning impacts. These waveforms are pulses having a maximum amplitude in common mode of 1.5 kilovolts (kV) for a so-called "K21 normal level" wave, or of 6.0 kV for a so-called "K21 enhanced level" wave.

Designing protection against lightning thus consists in providing means that enable the appliance to withstand one or the other of those waveforms without damage.

In practice, the design of such protection against lightning is made complicated in the context of a gateway that is designed to be installed in a home.

In order to be effective, protection against lightning requires the gateway to be connected to earth ground. Unfortunately, it is not possible to ensure that the final user will connect the appliance in effective manner to earth ground. In addition, the quality of a user's earth ground constitutes an additional unknown that also cannot be determined in advance.

A home gateway is electrically powered by a mains unit, itself connected to an electricity network of the 230 volts (V) type or of the 110 V type, and it is also connected to a digital subscriber line (DSL) typically comprising two conductor elements.

The gateway includes in particular internal components known as analog front-end (AFE) components that are coupled to the DSL line and that need to be protected against lightning.

When the gateway is not connected to earth ground or when its connection is poor, and a lightning impact occurs, then the electrical ground of the appliance may be raised to substantially the same potential as the conductor element of the DSL line, i.e. to a potential close to that of the surge voltage, which for a K21 enhanced level waveform is 6.0 kV.

In this situation, the other components of the gateway that are connected to electrical ground are subjected to a potential that is substantially equal to 6.0 kV. This applies in particular to components of the Ethernet port of such a gateway.

At present, the components of an Ethernet port are designed to withstand pulses having a maximum amplitude in common mode of 1.5 kV (K21 normal level). Thus, the 6.0 kV surge voltage that is imposed on electrical ground in the event of lightning allows the front-end components of the gateway to be protected, but nevertheless causes the Ethernet port to be damaged if the gateway is not connected to earth ground.

OBJECT OF THE INVENTION

The object of the invention is to provide an architecture that makes it possible to provide effective protection for the components of such an appliance against the effects of a lightning impact on the line to which such an appliance is connected, including when the appliance is not connected to earth ground.

SUMMARY OF THE INVENTION

In order to achieve this object, the invention provides an electronic appliance powered by a power supply unit connected to a mains type electricity network, and for connection to a transmission line having two conductor elements, and to a terminal in order to transfer data between the line and the terminal, the appliance comprising:

a front-end component connected to the line via an isolating transformer;

various additional components connected to an electrical ground of the appliance;

a discharge component such as a three-pole discharger connected to the conductor elements of the line and that becomes conductive in the event of a voltage surge due to the line being struck by lightning, thereby eliminating the surge by establishing a flow of current from the line to electrical ground so as to protect the components situated downstream of this protection, such as the transformer or the front-end component; and a capacitive and/or resistive type divider component interposed between the discharge component and electrical ground in order to co-operate with the power supply unit and/or one or more additional components to constitute a divider bridge, whereby the voltage imposed on the electrical ground of the appliance in the event of lightning is less than the surge to which the conductor elements of the line are subjected so as to provide protection also to the additional components.

Thus, when a lightning impact occurs, the components downstream are protected by the three-pole discharger. When the electronic appliance is connected to earth ground, the current is discharged to the earth ground. Otherwise, the divider component co-operates with the power supply unit and/or the additional components to constitute a voltage divider bridge that serves to limit the voltage that is imposed on electrical ground and thus on the terminals of the additional components of the appliance that are exposed to the lightning because they are connected to the electrical ground of the appliance.

BRIEF DESCRIPTION OF THE DRAWINGS

Reference is made to the figures of the accompanying drawings, in which.

DETAILED DESCRIPTION OF THE INVENTION

The idea on which the invention is based is to monitor the voltage level to which electrical ground of the equipment is subjected in the event of a lightning impact by adding a voltage divider component, but without compromising the performance of the equipment in nominal operation. The voltage divider component serves to weight the distribution of energy firstly between the telephone line and the electrical ground of the equipment, and secondly between electrical ground of the equipment and earth ground.

Specifically, a common point is provided that is connected to electrical ground in a divider bridge having at its ends an earth ground electrode of a three-pole discharger and electric interface components of a power supply unit and of Ethernet connection. The potential to which electrical ground is then subjected corresponds to the surge voltage generated by the lightning divided by a certain factor.

Figure 1:
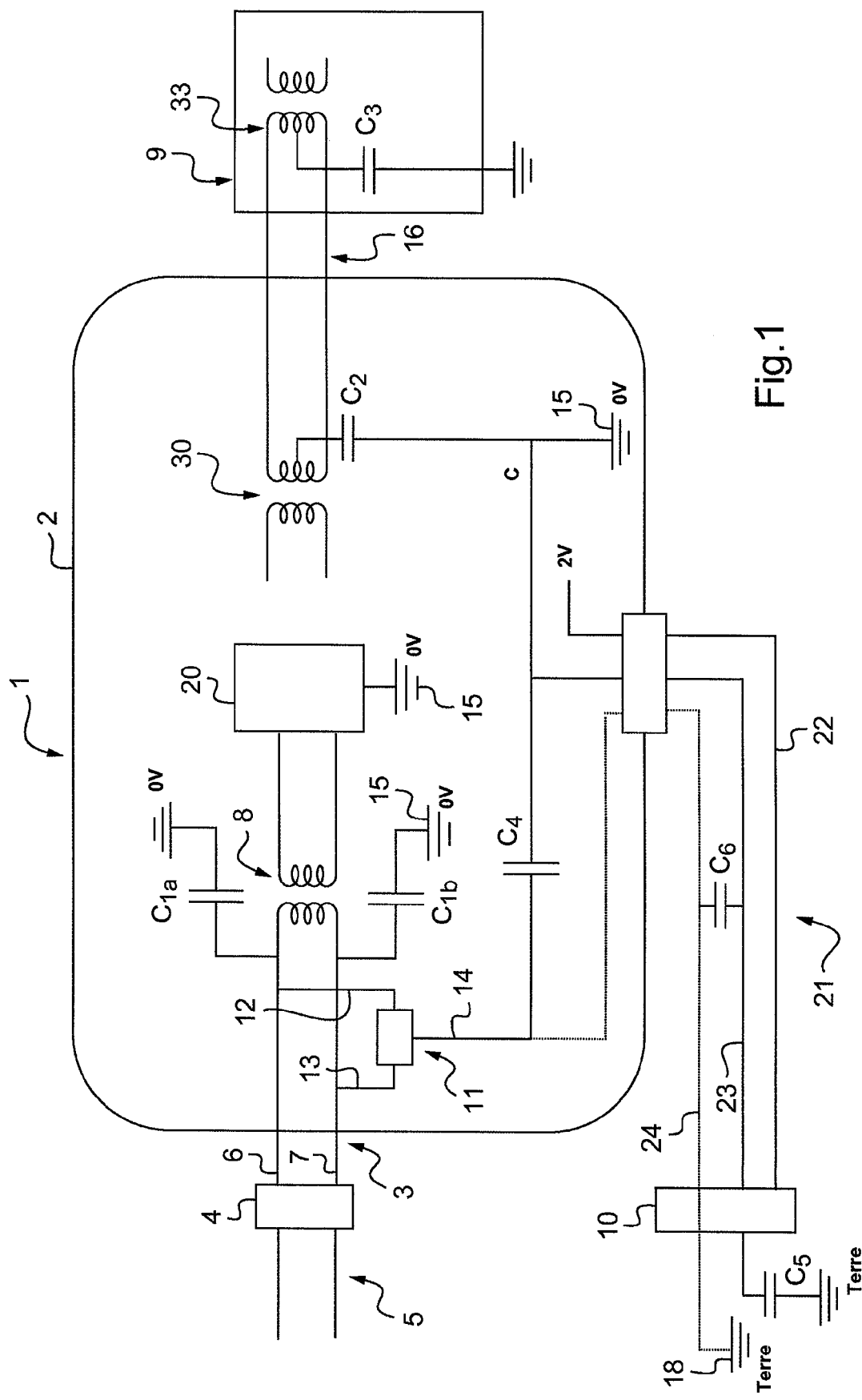
FIG. 1 is an electric circuit diagram of a home gateway of the invention.

A home gateway 1 of the invention, as shown in FIG. 1, includes an electric circuit 2 of the invention, which circuit is connected via a DSL line 3 and a telephone jack 4 to a telephone line 5. The DSL line 3 has two conductor elements 6 and 7 that convey digital data.

The home gateway 1 is also connected to a decoder unit 9 that co-operates with the home gateway 1 via an Ethernet line 16.

In order to isolate the gateway 1 and provide communication with the telephone line 5 and the Ethernet line 16 while filtering out interfering noise, the gateway 1 comprises:

an isolating transformer 8 and capacitors $C_{1a}$ and $C_{1b}$; and
an isolating transformer 30 and a capacitor $C_2$.

Likewise, in order to isolate the decoder unit 9 and provide communication with the Ethernet line 16, the decoder unit 9 has an isolating transformer 33 and a capacitor $C_3$.

The electric circuit 2 of the home gateway 1 is powered electrically by a mains unit 10, itself connected to an electricity network of the 230 V type or of the 110 V type. A power supply cable 21 connects the mains unit 10 to the gateway 1. The power supply cable has a power supply conductor element 22 carrying a power supply voltage, in this example at 12 V, and a reference conductor element 23 conveying a voltage of 0 V.

A three-pole discharger 11, having two phase electrodes 12 and 13 each connected to a respective conductor element 6 or 7 of the DSL line 3, and a ground electrode 14 connected to electrical ground 15 via a series capacitor $C_4$ of the gateway serves to protect both the electrical component (20, 8) coupled to the DSL line 3 and also additional components (30, C1, C2, C5) connected to electrical ground 15 from lightning impacts occurring on the telephone line 5.

There can also be seen capacitive coupling of the capacitor $C_5$ at the mains unit between earth ground 18 and the reference conductor element 23.

The capacitors $C_{1a}$, $C_{1b}$, $C_2$, $C_3$, $C_4$, and $C_5$ form a bridge that serves to divide the voltage imposed on electrical ground 15 when a lightning impact occurs on the telephone line 15 and the gateway 1 is not connected to earth ground 18.

For each electrical component, it is possible to define a withstand voltage Vmax that is the maximum voltage that may be applied to the terminals of the component without damaging it.

For applications of the type comprising the gateway 1 of the invention, components may be selected that present maximum voltages as defined below:

capacitors $C_{1a}$ and $C_{1b}$ that are dimensioned for the K21 enhanced level waveform, i.e. that present a withstand voltage Vmax greater than 6.0 kV;
a transformer 8 that has a withstand voltage Vmax substantially equal to the maximum amplitude of the K21 normal level waveform, i.e. 6.0 kV;
capacitors $C_2$ and $C_3$ that have a voltage Vmax slightly greater than the maximum amplitude of the K21 normal level wave, i.e. about 2.0 kV; and
isolating transformers 30 and 33 for the Ethernet connection that have a withstand voltage Vmax close to 8.0 kV.

It is particularly advantageous to select the capacitance of the capacitor $C_4$ so that when a lightning impact occurs giving rise to a maximum surge voltage, i.e. for the gateway 1 a surge voltage equal to the maximum amplitude of the K21 enhanced level waveform, the voltage that is imposed on electrical ground 15 is divided so that the voltage across the terminals of the electrical component remains less than their respective withstand voltages Vmax.

To optimize the selection of $C_4$, it is preferable to know the number of pieces of equipment that are to be connected to the gateway 1. However, usually, a user can select the number of pieces of equipment that are to be connected to the gateway. The dimensioning of $C_4$ may then be performed on the assumption of a maximum number of pieces of equipment being connected (e.g. equal to the number of Ethernet ports present on the gateway), or else on the basis of the most common number of pieces of equipment that are connected (in practice one or two pieces of equipment).

In order to illustrate the invention, the following values are selected for $C_{1a}$, $C_{1b}$, $C_2$, $C_3$, and $C_5$:

$C_{1a}$=45 picofarads (pf);
$C_{1b}$=45 pf;
$C_2$=1 nanofarad (nF);
$C_3$=1 nF; and
$C_5$=1 nF.

Figure 2A:
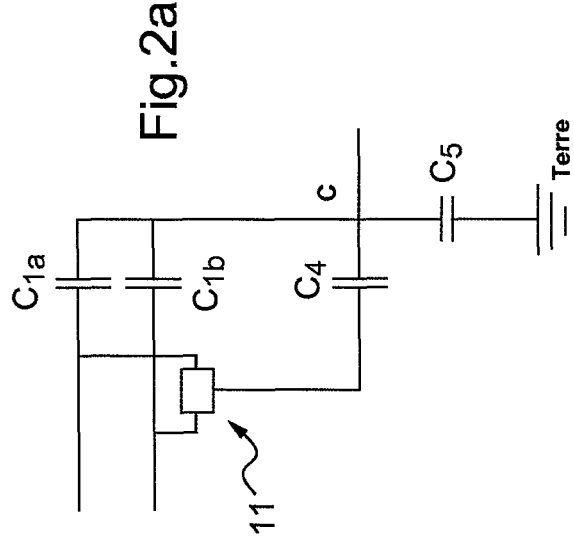
FIGS. 2a and 2b are capacitive equivalent electric circuit diagrams relative to a common point C of the electric circuit of the gateway of the invention.

FIG. 2a shows the divider bridge as seen at a common point C at the potential of the electrical ground 15 when no equipment is connected to the gateway 1 by an Ethernet connection (this may apply to a gateway that is adapted to transmit data solely over a wireless connection).

In order to optimize the divider bridge in this situation, $C_4$ is selected to be 910 pf, thus making it possible, when a lightning impact occurs and the gateway is not connected to earth ground, to obtain a voltage at the point C that is equal to half the surge voltage generated by the lightning.

Thus, although the transformer 8 of the DSL line has a withstand voltage Vmax of 6.0 kV, it is possible to subject the gateway to a surge voltage of 12.0 kV.

Figure 2B:
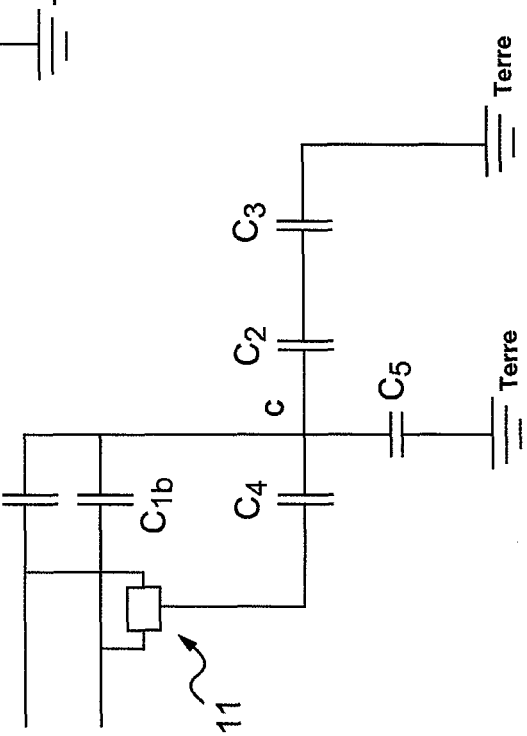

FIG. 2b shows the divider bridge seen at the point C when a single piece of equipment, in this example the decoder unit 9, is connected to the gateway 1 by an Ethernet connection. It may be decided to retain $C_4$=910 pf, or else to optimize this value for a gateway having a single piece of equipment connected thereto in order to reduce the voltage surge at electrical ground so that it remains less than the withstand voltage Vmax of $C_2$ and $C_3$.

Advantageously, it is possible to select components $C_2$ and $C_3$ that both present a withstand voltage Vmax, e.g. 6 kV, that is greater than their usual withstand voltage Vmax, which is about 2.0 kV. It is then preferable to select identical withstand voltages Vmax for both components, since the voltage across the terminals of $C_2$ and the voltage across the terminals of $C_3$ are substantially equal in the event of a lightning impact. This serves to increase robustness against lightning impacts for a system made up of the gateway and the decoder unit, while dimensioning a single component per piece of equipment. Deciding to increase the withstand voltage of the component $C_2$ on its own is indeed less advantageous than doing so for the pair of components $C_2$ and $C_3$, however it makes it possible to ensure that the gateway on its own is robust.

Advantageously, it is thus possible to provide a connection between the gateway 1 and earth ground 18. Under such circumstances, when a lightning impact occurs, current is discharged directly to earth ground 18 and electrical ground 15 is not subjected to any surge voltage.

This connection can be achieved using two different arrangements:
- a "two-conductor" arrangement that consists in connecting the reference conductor element 23 to earth ground 18 at the mains unit 10; or
- a "three-conductor" arrangement that consists in adding a third conductor element 24 to the power supply cable 21 (the third element being drawn as a dotted line in FIG. 1) in order to bring earth ground 18 to the gateway 1.

In the two-conductor arrangement, if the home network does not have an earth ground, which is quite common, then the electrical configuration reduces to that described above in the absence of an earth ground.

In the three-conductor arrangement, the proximity between the third-conductor element 24 and the reference conductor element 23 gives rise to parasitic capacitive coupling with parasitic capacitance $C_6$.

Figure 3:
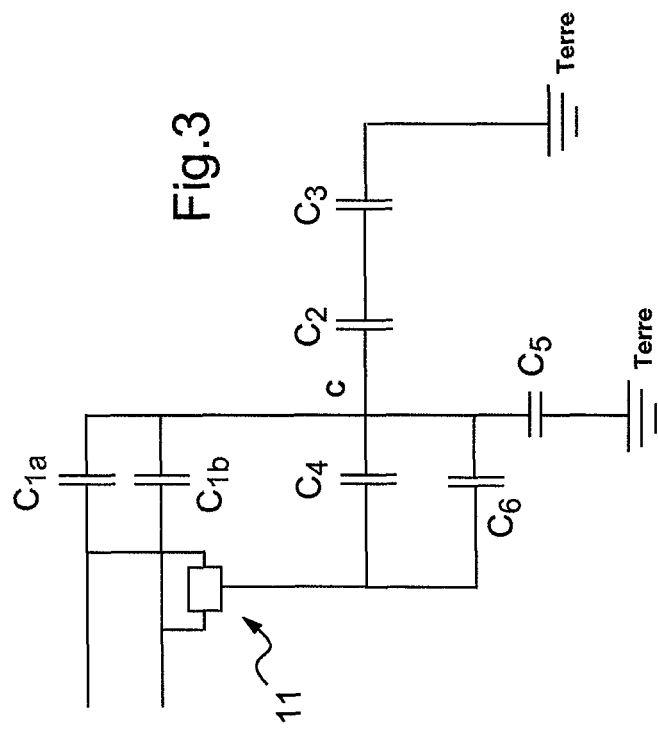
FIG. 3 is a capacitive equivalent electric circuit diagram relative to the common point C of the electric circuit of the gateway of the invention when earth ground is not connected to the gateway.

FIG. 3 shows the divider bridge seen at point C when the decoder unit 9 is connected to the gateway 1 by an Ethernet connection, and when a connection to earth ground is provided using the three-conductor arrangement, but the installation does not have an earth ground connection. It is important to take account of the contribution of the capacitance $C_6$ when dimensioning the divider bridge. Advantageously, it is even possible to dimension the bridge so that the capacitor $C_4$ is replaced by the capacitance $C_6$, thus making it possible to save the cost of a capacitor.

The capacitance of the capacitor $C_4$ is selected to be equal to 910 pf, but the invention naturally allows for using a capacitor $C_4$ of different capacitance, preferably lying in the range 200 pf to 2 nF. In particular, it is desirable to optimize this value when provision is made to connect the gateway to a plurality of pieces of equipment (the greater the number of pieces of equipment, the greater the value of the capacitance).

Furthermore, the invention is being illustrated with a capacitor $C_4$, however it is possible to replace this capacitor with a plurality of resistive components, or of capacitive components, or of both capacitive and resistive components.

In addition, the gateway of the invention is provided with means enabling it to count and store the number of lightning impacts to which it is subjected during its lifetime.

This information may be used subsequently by after-sales service, by the telephone operator, or by any other party when acting on the gateway, or indeed in order to change it as a preventative measure once it has been subjected to a number of lightning impacts that is deemed to be excessive.

Figure 4:
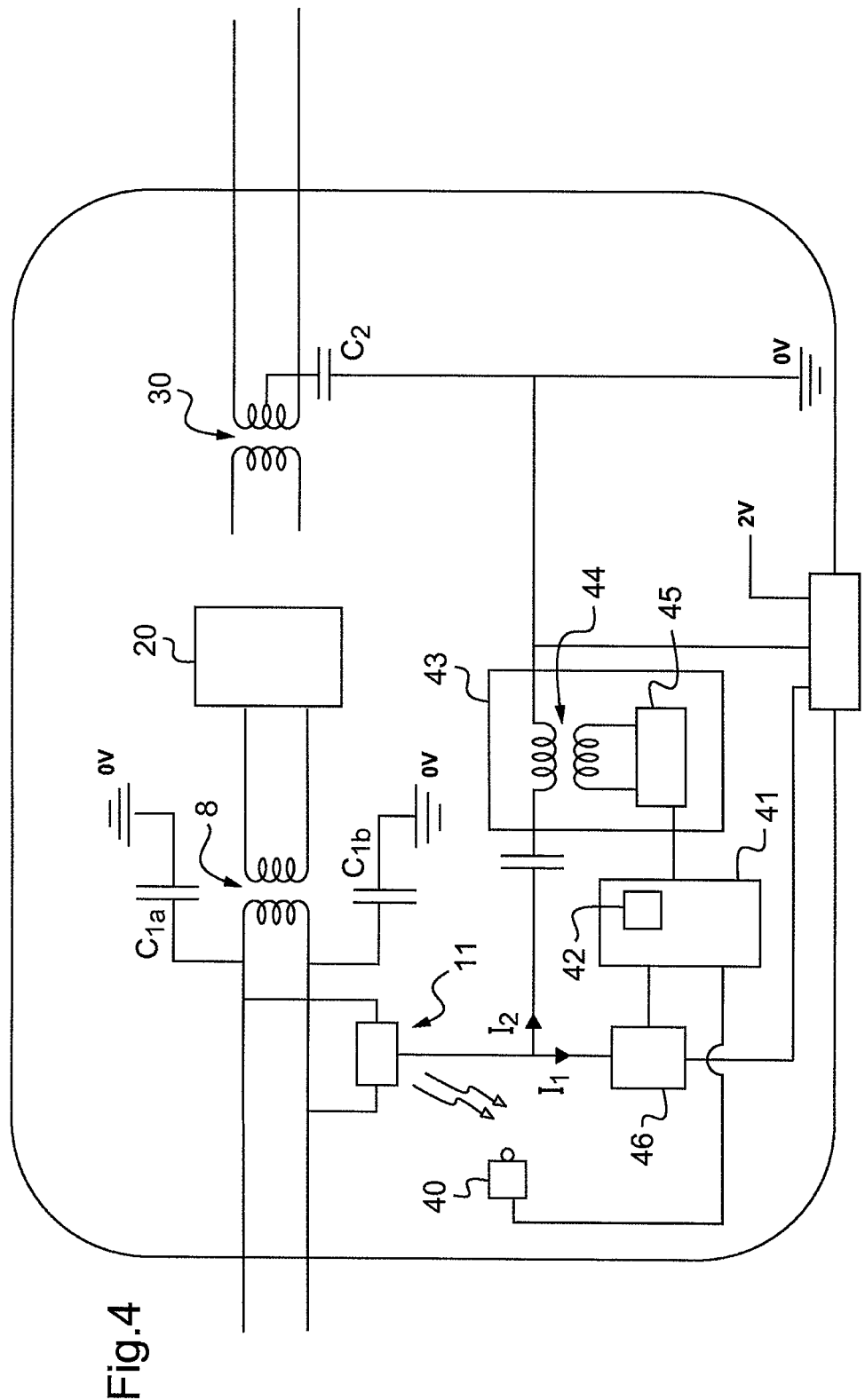
FIG. 4 is an electric circuit diagram of a home gateway of the invention further including two current sensors and a photodiode.

FIG. 4 shows a photodiode 40 mounted close to the discharger 11, i.e. in a region of the gateway 1 where it is possible to detect the luminous arc that is created by current passing through the discharger 11 as occurs when the telephone line 5 is struck by lightning.

The photodiode 40 detects lightning impacts and delivers information indicting that an impact has occurred to a processor 41 that has a memory 42. Thereafter, this information can be read by a technician, either by opening the gateway 1, or by connecting a special connector thereto.

It is also possible to provide the gateway 1 with a current sensor 43 for detecting current being discharged when a lightning impact occurs, or for measuring current, and suitable in particular for counting lightning impacts. Such a current sensor 43 is shown in FIG. 4. The sensor 43 comprises a current transformer 44 having its primary connected in series with the capacitor $C_4$ in order to create an image of that current in its secondary, and acquisition means 45 enabling the current to be transformed into a voltage, and then enabling the voltage to be measured. Naturally, the current sensor could perfectly well be a sensor using different technology, e.g. the Hall effect.

When a connection to earth ground is provided using the two-conductor arrangement, it may be advantageous to provide the gateway with two current sensors 43 and 46, one sensor 46 measuring the current $I_1$ that is discharged to earth ground when the gateway 1 is connected to earth ground, and another sensor 43 for measuring the current $I_2$ to measure the current that is discharged by electrical ground 15. By comparing the measured values $I_1$ and $I_2$, it is possible to deduce a certain amount of information that can subsequently be stored in the memory 42. Thus, in a particular implementation of the invention:
- if $I_1 \approx 0$ amps (A) and $I_2 \neq 0$ A, it can be deduced that the electricity network does not have an earth ground connection and $I_2$ is used for counting lightning impacts and for estimating the level of an impact;
- if $I_1 \neq 0$ A and $I_2 \approx 0$ A, it is deduced that the electricity network has an earth ground connection, and $I_1$ is used for counting lightning impacts and for estimating the level of an impact; and
- if $I_1 \neq 0$ A and $I_2 \neq 0$ A, it is deduced that the electricity network has an earth ground connection of poor quality, and $I_1$ and $I_2$ are used for counting lightning impacts, for estimating the level of an impact, and for estimating the quality of the connection to earth ground.

The invention claimed is:

1. An electronic appliance powered by a power supply unit connected to a mains type electricity network, and for connection to a transmission line having two conductor elements, and to a terminal in order to transfer data between the line and the terminal (9), the appliance comprising:
   - a front-end component connected to the line via an isolating transformer;
   - various additional components connected to an electrical ground of the appliance;
   - a discharge component such as a three-pole gas discharger connected to the conductor elements of the line and that becomes conductive in the event of a voltage surge due to the line being struck by lightning, thereby eliminating the surge by establishing a flow of current from the line to electrical ground so as to protect the components situated downstream of this protection, such as the transformer or the front-end component; and
   - a capacitive and/or resistive type divider component interposed between the discharge component and electrical ground in order to co-operate with the power supply unit and/or one or more additional components to constitute a divider bridge, whereby the voltage imposed on the electrical ground of the appliance in the event of lightning is less than the surge to which the conductor elements (6, 7) of the line are subjected so as to provide protection also to the additional components.

2. The electronic appliance according to claim 1, wherein the discharge component is a three-pole gas discharger having two phase electrodes and an earth ground electrode, each phase electrode being connected to a respective conductor element of the transmission line, and the earth ground electrode being connected to the divider component.

3. The electronic appliance according to claim 2, wherein the divider component has capacitance lying in the range 0 nF to 2 nF.

4. The electronic appliance according to claim 1, connected to an earth ground of the electricity network by a dedicated conductor of the power supply cable connecting the power supply unit to the electronic appliance.

5. The electronic appliance according to claim 1, further including counter means for counting lightning impacts.

6. The electronic appliance according to claim 1, wherein the counter means comprise a photodetector detecting a luminous arc created by the discharger during a lightning strike.

7. The electronic appliance according to claim 5, wherein the counter means include a current sensor.

8. The electronic appliance according to claim 5, wherein the electronic appliance further includes a line for discharging current to earth ground and wherein the counter means include two current sensors, a first current sensor being connected in series with the divider component, and a second current sensor being arranged to measure the current flowing in the discharge line to earth ground.

9. The electronic appliance according to claim 5, further including a memory component for storing data supplied by a current detector.

10. A system comprising an electronic appliance according to claim 1, and a terminal, the terminal being connected to the appliance by a transmission line and including additional components, the system being characterized in that components from among the additional components of the electronic appliance and components from among the additional components of the terminal are dimensioned to withstand the same predetermined voltage surge level.

* * * * *